United States Patent [19]
Sigler

[11] Patent Number: 5,121,653
[45] Date of Patent: * Jun. 16, 1992

[54] CONTROL DEVICE HAVING A PUSH TO TURN SELECTOR MEANS

[75] Inventor: Kent K. Sigler, Youngwood, Pa.

[73] Assignee: Robertshaw Controls Company, Richmond, Va.

[*] Notice: The portion of the term of this patent subsequent to Jun. 4, 2008 has been disclaimed.

[21] Appl. No.: 677,783

[22] Filed: Mar. 29, 1991

Related U.S. Application Data

[63] Continuation of Ser. No. 400,475, Aug. 30, 1989, Pat. No. 5,020,389.

[51] Int. Cl.⁵ ............................................. G05G 1/10
[52] U.S. Cl. ................................... 74/553; 74/10 R; 74/527; 403/335; 464/162
[58] Field of Search .............. 74/553, 10 R, 527; 464/162, 169; 403/335; 192/67 P

[56] References Cited

U.S. PATENT DOCUMENTS

| | | | |
|---|---|---|---|
| 232,926 | 10/1880 | Berkholz | 192/67 P X |
| 2,494,639 | 1/1950 | Yates | 464/162 |
| 2,704,466 | 3/1955 | Way | 74/553 X |
| 2,899,808 | 8/1959 | Berens | 464/169 X |
| 3,214,538 | 10/1965 | Tyler | 74/553 X |
| 3,999,442 | 12/1976 | Decker et al. | 74/10 R |
| 4,197,765 | 4/1980 | Shimoda | 74/553 |
| 5,020,389 | 6/1991 | Sigler | 74/553 |

FOREIGN PATENT DOCUMENTS

| | | | |
|---|---|---|---|
| 1217052 | 5/1960 | France | 74/10 R |
| 493256 | 10/1938 | United Kingdom | 74/10 R |

Primary Examiner—Rodney H. Bonck
Attorney, Agent, or Firm—Candor, Candor & Tassone

[57] ABSTRACT

A control device having a push to turn selector arrangement and method of making the same are provided, the control device comprising a support unit, a first selector member threadedly carried by the support unit so as to be rotatable and axially movable relative thereto, a second selector member rotatably carried by the support unit and being axially movable relative thereto, a coupling structure coupling the selector members together to cause the first selector member to rotate in unison with the second selector member when the second selector member is axially pushed inwardly and then rotated, and a spring unit disposed between the selector members to tend to maintain the second selector member axially away from the first selector member, the coupling unit comprising a drive plate rotatably carried by the support unit intermediate the selector members and having parts thereof respectively splined to the selector members to transmit rotatable movement of the second selector member to the first selector member while permitting axial movement of the selector members relative to the drive plate.

10 Claims, 10 Drawing Sheets

CONTROL DEVICE HAVING A PUSH TO TURN SELECTOR MEANS

CROSS REFERENCE TO RELATED APPLICATIONS

This application is a continuation patent application of its copending parent patent application, Ser. No. 400,475, filed Aug. 30, 1989, now U.S. Pat. No. 5,020,389.

BACKGROUND OF THE INVENTION

1. Field of the Invention

This invention relates to a new control device having a unique push to turn selector means.

2. Prior Art Statement

It is known to provide a control device having a push to turn selector means and comprising a support means, a first selector member threadedly carried by the support means so as to be rotatable and axially movable relative thereto, a second selector member rotatably carried by the support means and being axially movable relative thereto, coupling means coupling the selector members together to cause the first selector member to rotate in unison with the second selector member when the second selector member is axially pushed inwardly and then rotated, and spring means disposed between the selector members to tend to maintain the second selector member axially away from the first selector member For example, see the U.S. Pat. No. 3,999,442, to Decker et al.

SUMMARY OF THE INVENTION

It is one feature of this invention to provide a unique push to turn selector means for a control device.

In particular, it was found according to the teachings of this invention that a drive plate can be provided to couple a first selector member of the control device to a second selector member of the control device with such coupling member having means respectively splined to the selector members to transmit rotatable movement of the second selector member to the first selector member while permitting axial movement of the selector members relative to the drive plate.

For example, one embodiment of this invention provides a control device having a push to turn selector means and comprising a support means, a first selector member threadedly carried by the support means so as to be rotatable and axially movable relative thereto, a second selector member rotatably carried by the support means and being axially movable relative thereto, coupling means coupling the selector members together to cause the first selector member to rotate in unison with the second selector member when the second selector member is axially pushed inwardly and then rotated, and spring means disposed between the selector members to tend to maintain the second selector member axially away from the first selector member, the coupling means comprising a drive plate rotatably carried by the support means intermediate the selector members and having means respectively splined to the selector members to transmit rotatable movement of the second selector member to the first selector member while permitting axial movement of the selector members relative to the drive plate.

Accordingly, it is an object of this invention to provide a new control device having a push to turn selector means, the control device of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
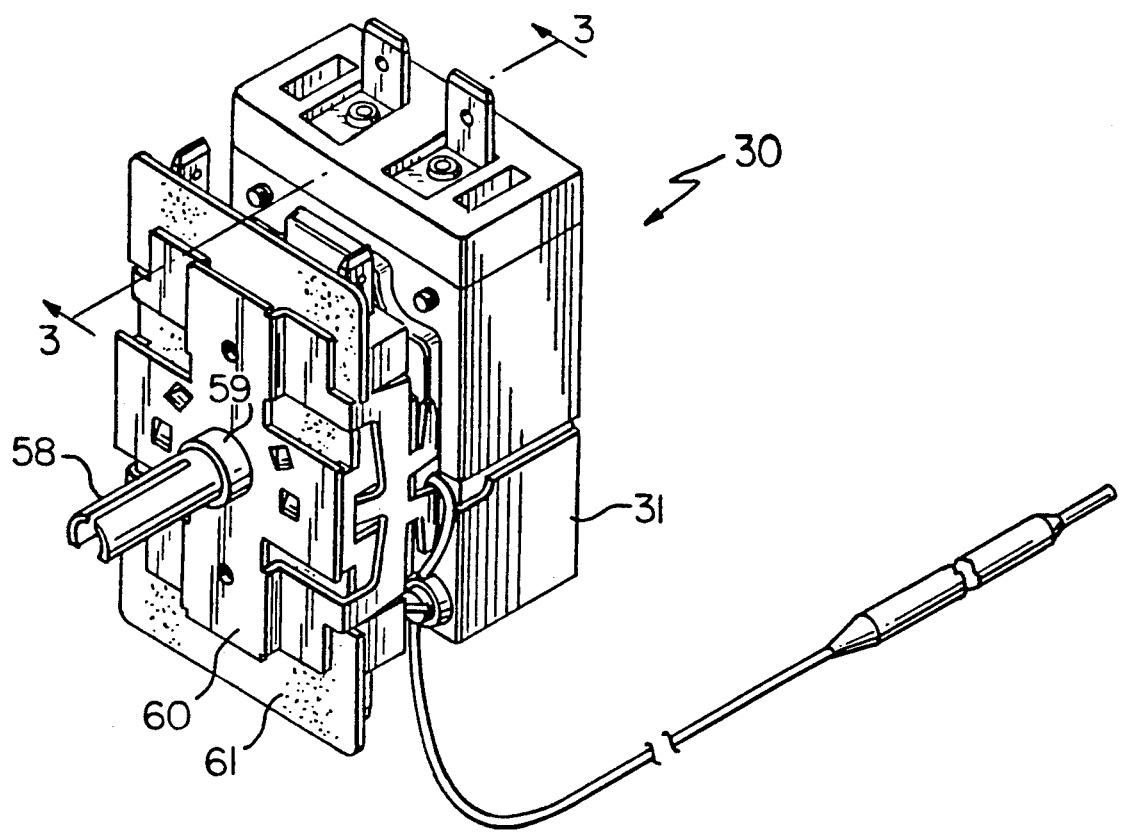
FIG. 1 is a perspective view of one control device of this invention with the control knob thereof removed.

While the various features of this invention are hereinafter illustrated and described as being particularly adapted to provide a control device with certain electrical switch actions and/or certain temperature setting functions, it is to be understood that the various features of this invention can be utilized singly or in various combinations thereof to provide a control device having other types of operation as desired.

Therefore, this invention is not to be limited to only the embodiments illustrated in the drawings, because the drawings are merely utilized to illustrate one of the wide variety of uses of this invention.

Figure 2:
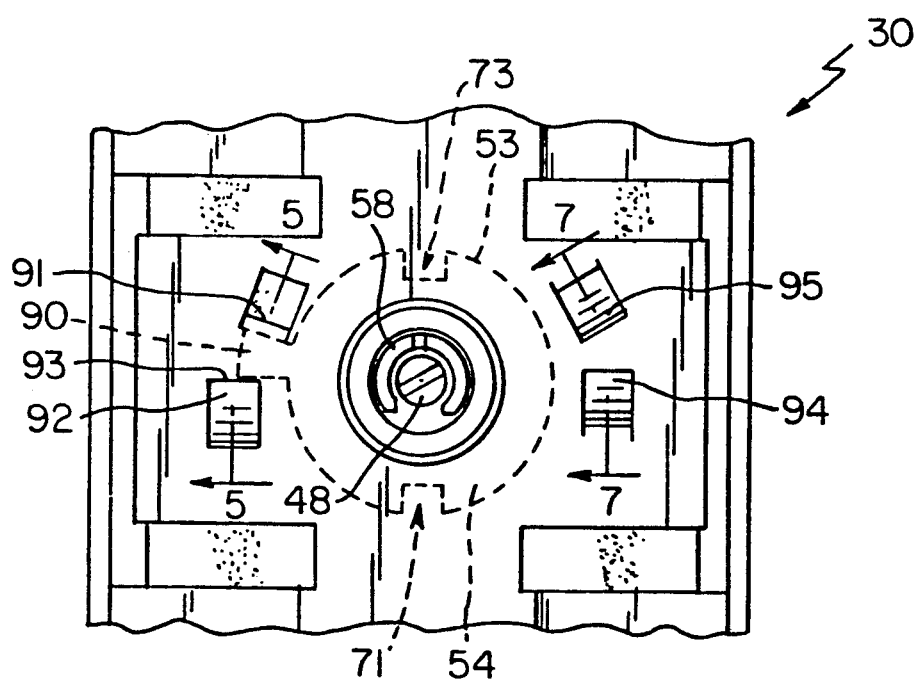
FIG. 2 is an enlarged fragmentary front view of the control device illustrated in FIG. 1.
Figure 3:
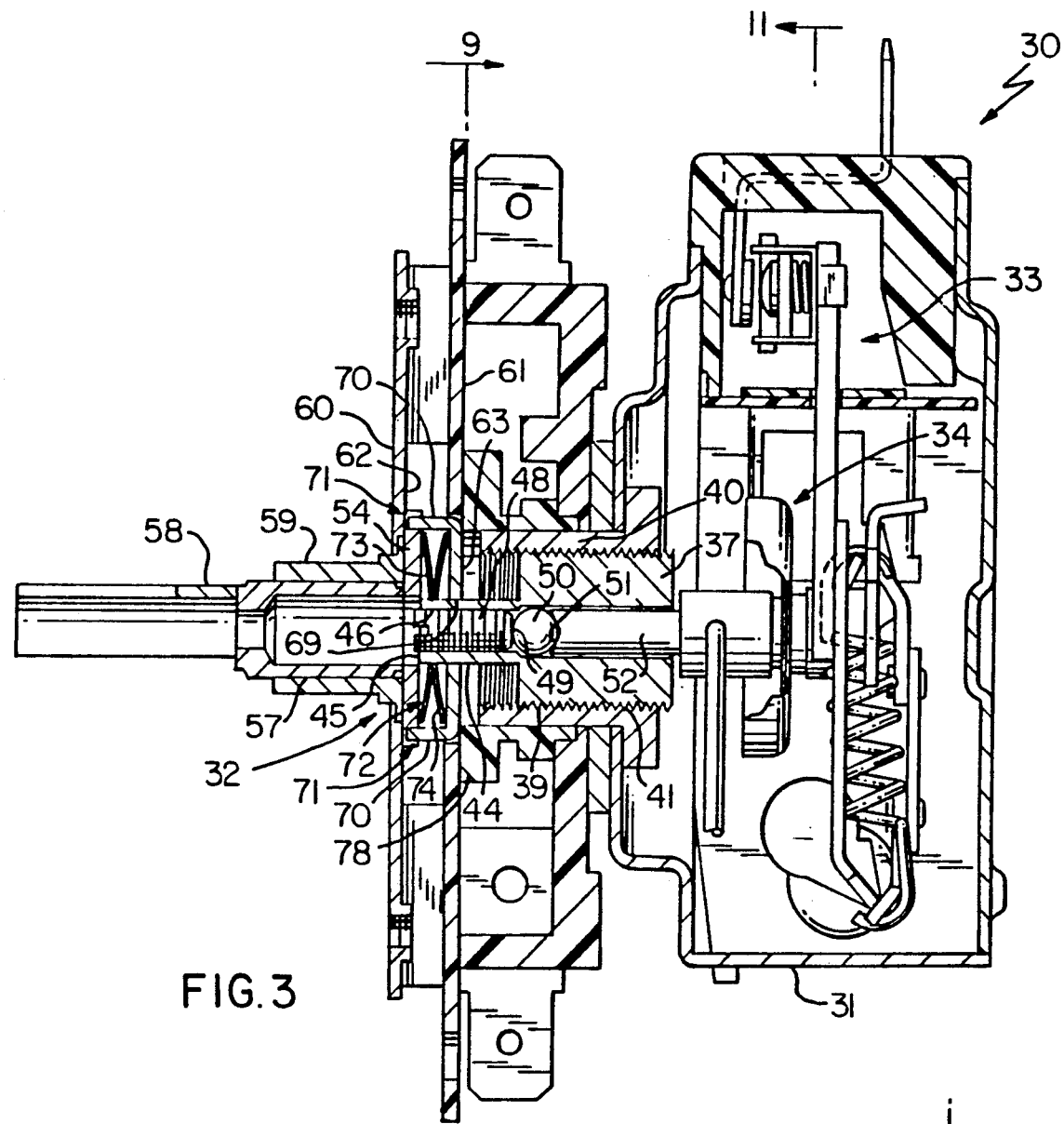
FIG. 3 is an enlarged cross-sectional view taken on line 3—3 of FIG. 1.
Figure 9:
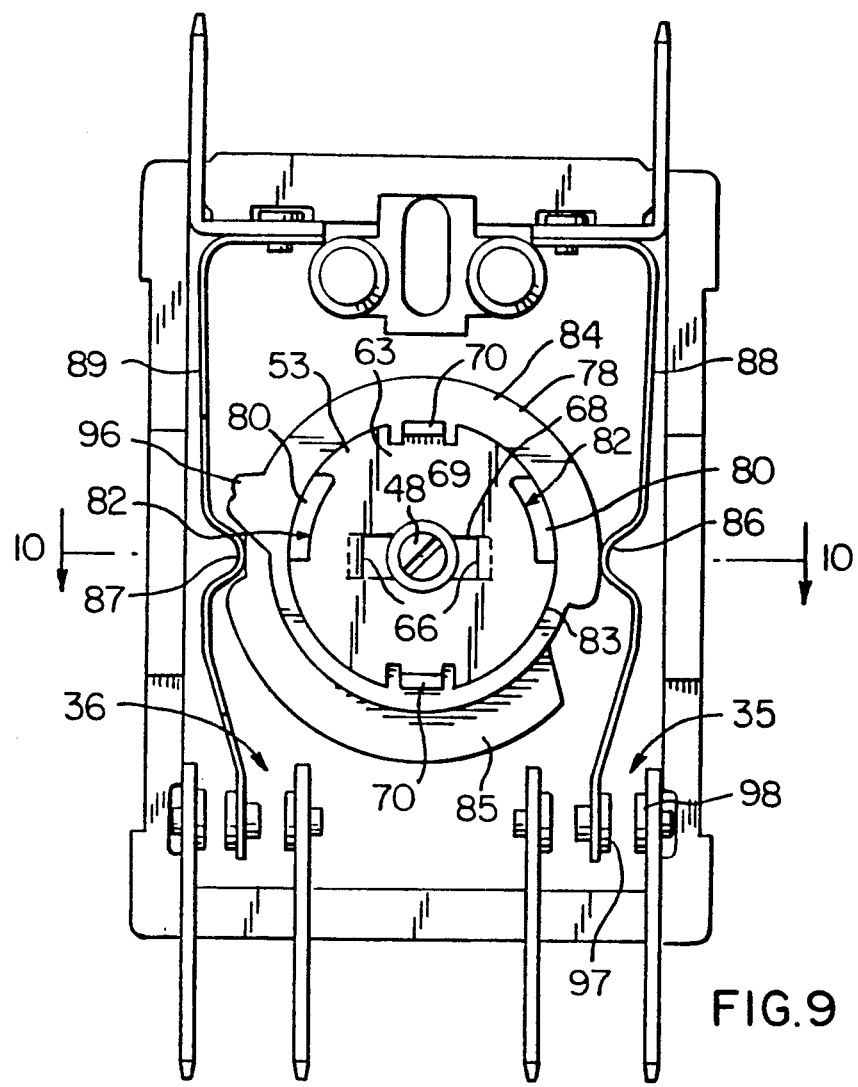
FIG. 9 is a cross-sectional view of the control device of FIG. 1 and is taken in the direction of the arrows 9—9 of FIG. 3.
Figure 10:
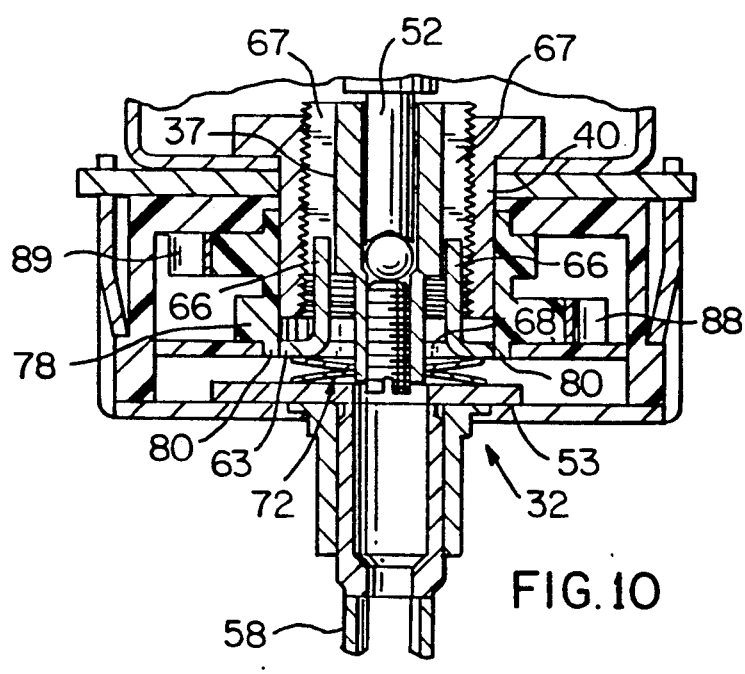
FIG. 10 is a fragmentary cross-sectional view taken on line 10—10 of FIG. 9.
Figure 11:
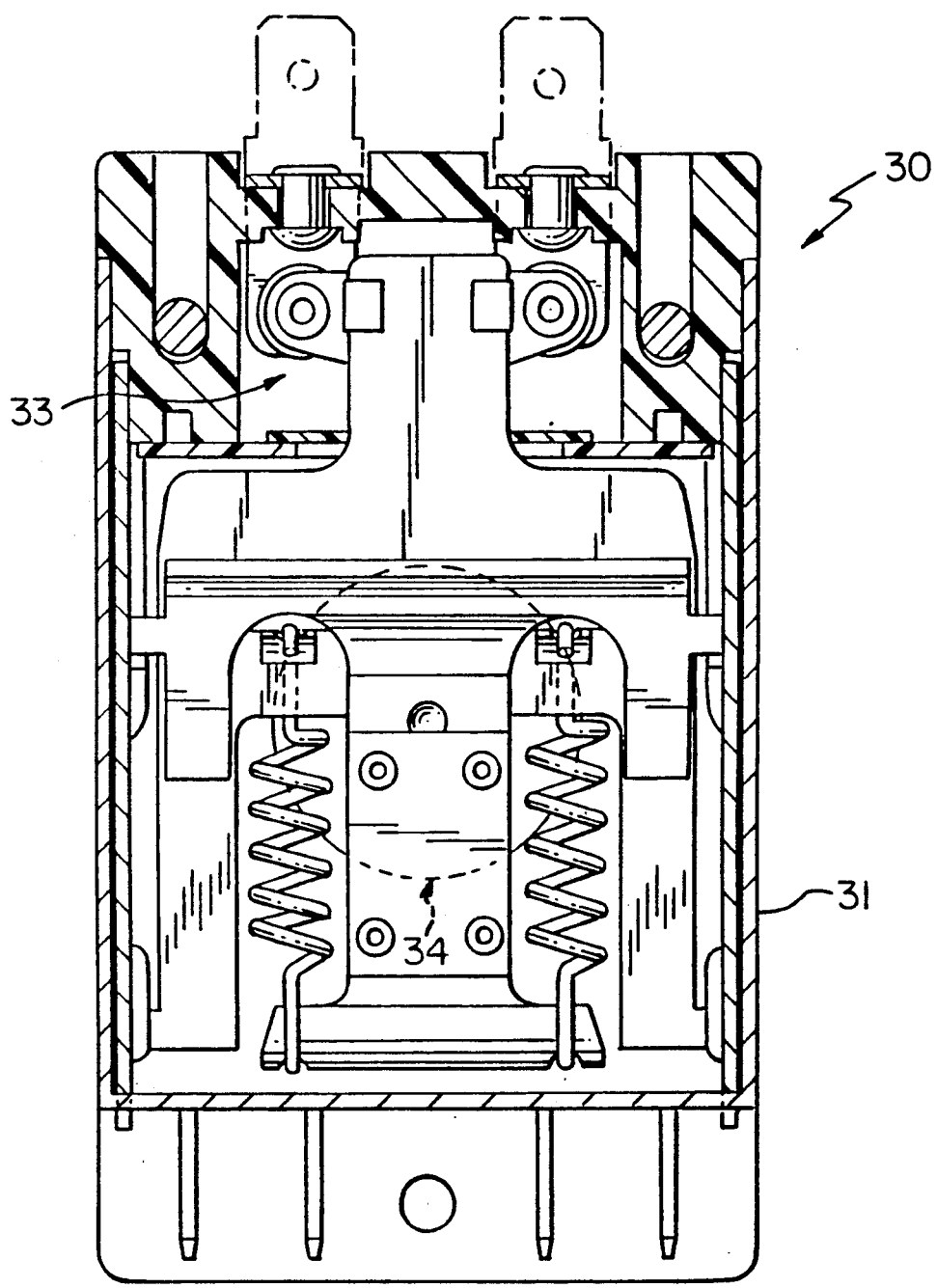
FIG. 11 is a cross-sectional view taken on line 11—11 of FIG. 3.
Figure 12:
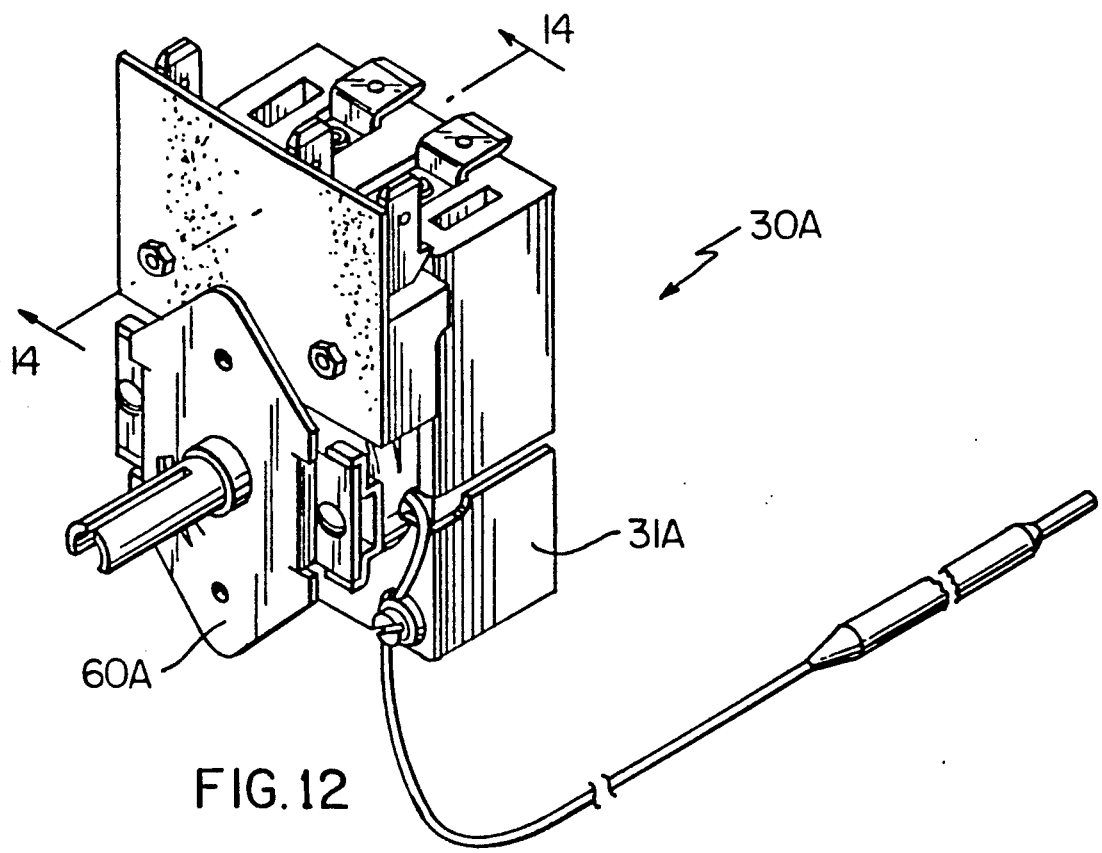
FIG. 12 is a perspective view of another control device of this invention with the control knob thereof removed.
Figure 13:
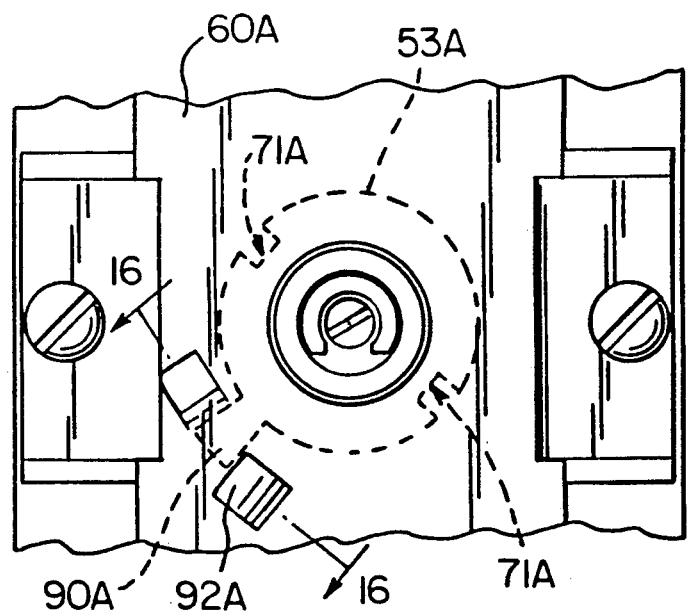
FIG. 13 is an enlarged fragmentary front view of the control device illustrated in FIG. 12.

Referring now to FIGS. 1, 2 and 3, a new control device of this invention is generally indicated by the reference numeral 30 and comprises a support means or housing structure 31 carrying a push to turn selector means that is generally indicated by the reference numeral 32, a first electrical switch means that is generally indicated by the reference numeral 33 and operated by a temperature responsive device that is generally indicated by the reference numeral 34 and carried by the support means 31, a second electrical switch means that is generally indicated by the reference numeral 35 in FIG. 9 and a third electrical switch means that is generally indicated by the reference numeral 36 in FIG. 9.

Since the operation of the temperature responsive means 34 and of the electrical switch means 33, 35 and 36 of the control device 30 can control any suitable means, such as the heating means of a cooking apparatus or the like all in a manner well known in the art, a further discussion of the details of the structure and of the operation thereof will not be set forth except as needed to understand the various features of this invention.

In particular, it has been previously set forth that the push to turn selector means 32 of this invention has unique means to control the setting of the temperature responsive means 34 and the operation of the electrical switch means 33, 35 and 36 whereby the structure of the push to turn selector means 32 will now be described.

Figure 4:
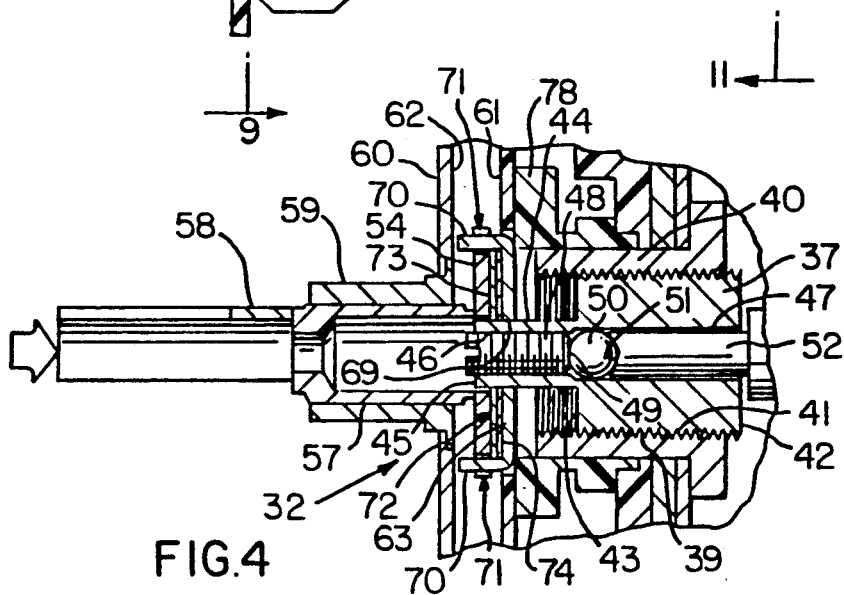
FIG. 4 is a fragmentary view similar to FIG. 3 and illustrates the second selector member of the control device of FIG. 3 pushed axially inwardly to permit the same to be subsequently rotated.
Figure 8:
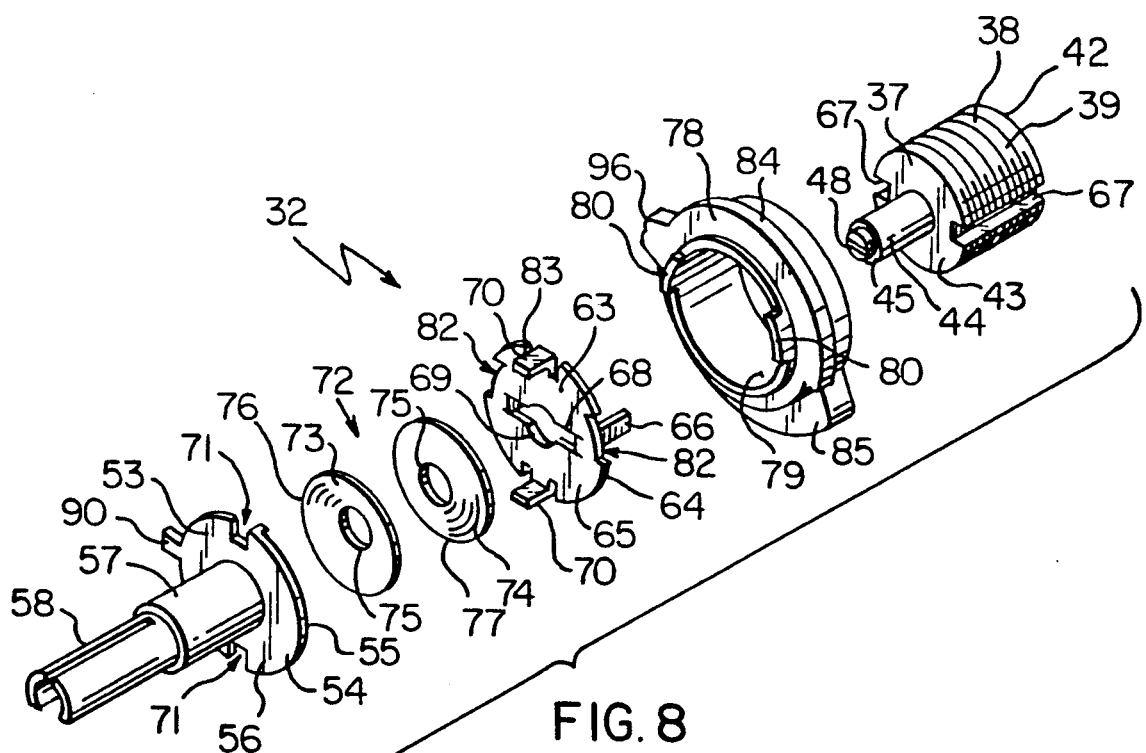
FIG. 8 is an exploded perspective view illustrating the various parts of the push to turn selector means of the control device of FIG. 1.

As illustrated in FIG. 8, the push to turn selector means 32 comprises a first selector member 37 that is substantially cylindrical and has an outer peripheral surface 38 that is externally threaded by threads 39 so as to be threadedly disposed in a tubular member 40 of the support means 31 as illustrated in FIGS. 3 and 4, the tubular member 40 having internal threads 41 disposed in threaded relation with the threads 39 of the first selector member 37 so that rotation of the selector member 37 relative to the support means 31 causes the selector member 37 to be axially moved through its threaded relation with the tubular member 40 and thereby set the temperature that the temperature responsive device 34 operates the switch means 33 for a purpose well known in the art.

The first selector member 37 has opposed ends 42 and 43 with a reduced cylindrical section 44 extending centrally from the end 43 and having a free end 45 interrupted by a passage means 46, FIG. 4, that is aligned with another passage means 47 that interrupts the other end 42 of the first selector member 37. The passage 46 is internally threaded and receives a threaded adjusting screw 48 therein that has an inner end 49 for abutting against a ball member 50 disposed in the passage 47 and abutting against an end 51 of a stem 52 of the temperature responsive means 34 that is spring urged toward the ball member 50 whereby the physical position of the temperature responsive means 34 within the support means 31 is controlled by the stem 52 thereof effectively being positioned by the threaded relationship of the first selector member 37 in the tubular member 40 of the support means 31 in a manner well known in the art.

The push to turn selector means also includes a second selector member 53 that comprises a disk-like member 54 having opposed substantially flat sides 55 and 56 with a tubular part 57 extending centrally from the side 56 thereof and being interconnected to a C-shaped selector shaft 58 that is adapted to be interconnected to a selector knob (not shown) in a manner well known in the art.

The second selector member 53 is adapted to be rotatably carried by the support means 31 of the control device 30 by having the tubular part 57 thereof telescoped through a tubular member 59 of the support means 31 so that the disk part 57 thereof is disposed intermediate two spaced wall means 60 and 61 of the support means 31 as illustrated in FIGS. 3 and 4 so that the second selector member 53 can be axially moved from the out position thereof wherein the side 56 of the disk 54 is disposed against the inside surface 62 of the wall 60 as illustrated in FIG. 4 wherein the disk member 54 has been moved away from the surface 62 of the wall 60 to permit the second selector member 53 to be then rotated as will be apparent hereinafter.

The push to turn selector means 32 also comprises a drive plate means 63 that is substantially flat and has opposed sides 64 and 65, the drive plate means 63 having a pair of spaced apart tangs or spline members 66 carved from the medial portion thereof and bent substantially at right angles relative to the side 64 thereof to be respectively received in longitudinal grooves or slots 67 formed in the first selector member 37 and interrupting the external peripheral surface 38 thereof on opposite sides of the longitudinal axis of the first selector member 37 so that the drive plate 63 will cause rotational movement of the selector member 37 when the drive plate 63 is rotated while permitting axial movement of the selector member 37 relative to the drive plate 63 as will be apparent hereinafter.

The carving of the tangs 66 from the medial portion of the drive plate 63 defines an opening means 68 through the drive plate 63 with the opening means 68 having a central portion 69 that readily permits the drive plate 63 to be telescopically disposed on the reduced cylindrical part 44 of the selector member 37 in the manner illustrated in FIGS. 3 and 4.

Another pair of tangs or spline members 70 are integral and one-piece with the drive plate 63 and are bent at right angles relative to the side 65 of the drive plate 63 so as to be respectively disposed in cooperating grooves or slots 71 formed in the disk part 54 of the second selector member 53 so that rotational movement of the second selector member 53 will cause like rotational movement of the drive plate 63 while permitting axial movement of the selector member 53 relative to the drive plate 63 as will be apparent hereinafter.

The push to turn selector means 32 also comprises a spring means that is generally indicated by the reference numeral 72 in FIG. 8 and comprises a pair of dished spring washer members 73 and 74 each having an opening 75 passing through the bowed central portion thereof so that the spring members 73 and 74 can be telescopically disposed on the reduced cylindrical part 44 of the first selector member 37 intermediate the disk 54 of the second selector member 53 and the drive plate 63. In this manner, an outer edge 76 of the spring washer 73 will bear against the side 55 of the disk 54 and an outer edge 77 of the spring washer 74 will bear against the side 65 of the drive plate 63 in the manner illustrated in FIGS. 3 and 4 so that the compressive force of the spring members 73 and 74 in the compacted condition thereof tends to push the second selector member 53 axially away from the first selector member 37 to the out position illustrated in FIG. 3 wherein the side 56 of the disk 54 is disposed against the surface 62 of the wall 60.

The use of the washer-like members 73 and 74 in a push to turn selector means is illustrated and described in the aforementioned U.S. Pat. No. No. 3,999,442, to Decker et al, whereby this patent is being incorporated into this disclosure by this reference thereto.

The support means 31 of the control device 30 includes a rotatable cam member or control structure 78 that has a central opening 79 passing axially therethrough and telescopically receiving the tubular member 40 therein in the manner illustrated in FIGS. 3 and 4 so that the cam member 78 is rotatably mounted on the tubular member 40.

The cam member 78, in turn, rotatably mounts the drive plate 63 by having a pair of outwardly directed tangs or surface means 80 thereof respectively received in suitable slots 82 formed in the outer periphery or surface means 83 of the drive plate 63 in the manner illustrated in FIG. 9 so that rotational movement of the drive plate 63 causes simultaneous rotation of the cam member 78, the cam member 78 having cam lobe means 84 and 85 respectively for operating on cam follower means 86 and 87 of switch blade means 88 and 89 of the switch means 35 and 36.

The disk 54 of the second selector member 53 has an outwardly directed lock tang 90 that is adapted to be disposed between a first lock tang 91 that is carved from the wall 60 of the support means 31 and extends substantially at a right angle relative to the side 62 thereof and a second lock tang 92 also carved from the wall 60 and being angled relative thereto so that the same has a free end 93 against which the tang 90 of the second selector member 53 abuts in its locked condition.

Figure 5:
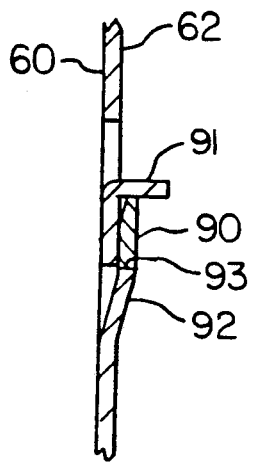
FIG. 5 is a fragmentary cross-sectional view taken on line 5—5 of FIG. 2 and illustrates the structure for locking the second selector member from rotation thereof when the second selector member is disposed in its axially outward postion of FIG. 3.

Thus, with the second selector member 53 of the selector means 32 in the out axial position illustrated in FIGS. 3 and 5, the selector member 53 cannot be rotated relative to the support means 31 of the control device 30 because the lock tang 90 of the selector member 53 is held between the lock tangs 91 and 92 of the support means 31.

However, when the operator pushes axially inwardly on the selector member 53 so that the same moves axially inwardly from the position illustrated in FIG. 3 to the position illustrated in FIG. 4 in opposition to the force of the spring washers 73 and 74 which collapse toward each other to permit such inward axial movement of the selector member 53, lock tang 90 of the selector member 53 clears the end 93 of the lock tang 92 of the wall 60 to permit the selector member 53 to now be rotated in a counterclockwise direction in FIG. 2 and once the tang 90 has been rotated to clear the end 93 of the lock tang 92 of the wall 60, the lock tang 90 of the selector member 53 can now again engage against the side 62 of the wall 60 under the force of the spring means 72 and permit further rotation of the selector member 53 in a counterclockwise direction or clockwise direction. Such rotational movement of the selector member 53 is transmitted by the drive plate 63 to the first selector member 37 to cause the same to rotate and thereby to thread inwardly and outwardly in the tubular member 40 as the case may be to set the temperature setting for the temperature responsive device 34 as previously set forth.

Such rotational movement of the selector member 53 and, thus, of the drive plate 63 causes the cam member 78 to likewise be rotated with the drive plate 63 for acting on the switch blades 88 and 89 of the switch means 35 and 36 as previously set forth.

Figure 7:
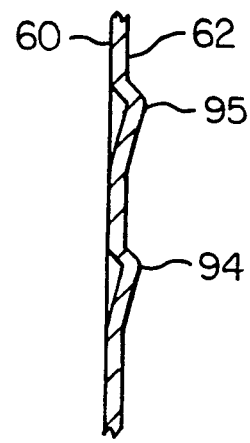
FIG. 7 is a fragmentary cross-sectional view taken on line 7—7 of FIG. 2 and illustrates detent structure of the control device.

For example, when the drive tang of the selector member 53 has been rotated so as to position the same between a pair of detent means 94 and 95 formed in the wall 60 so as to extend outwardly from the side 62 thereof as illustrated in FIG. 7, the operator will know that the selector member 53 has been disposed in a rotational position thereof wherein the high portion 96 of the cam lobe 84 of the cam member 78 will be acting on the cam follower 86 of the switch blade 88 to operate the switch 35 in a certain manner, such as by having a movable contact 97 of the switch blade 88 disposed in electrical contact with a fixed contact 98 of the switch means 95.

Figure 6:
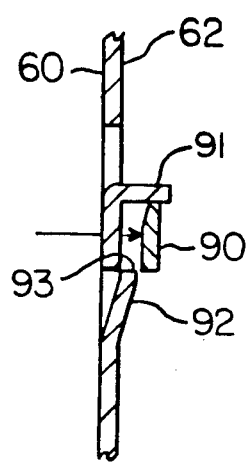
FIG. 6 is a view similar to FIG. 5 and illustrates how the second selector member is unlocked from the support means of the control device when the second selector member has been axially pushed inwardly as illustrated in FIG. 4.

When it is desired to turn the control device 30 to its off condition, the operator rotates the second selector member 53 in a clockwise direction in FIG. 2 to cause the lock tang 90 thereof to move to the lock tang 92 and cam over the same so as to be disposed against the lock tang 91 and be disposed behind the edge 93 of the lock tang 92 in the manner illustrated in FIG. 5 by the force of the spring means 72 so that the selector member 53 is again locked in its axial out position, such locking and unlocking of the second selector member 53 in a push to turn selector means also being a feature that is fully set forth in FIGS. 3 and 6 of the aforementioned U.S. Pat. No. No. 3,999,442, to Decker et al.

Therefore, it can be seen that the rotatable drive plate 63 of the selector means 32 of this invention is rotatably carried by the support means 31 of the control device 30 intermediate the selector members 37 and 53 and has spline means 66 and 70 respectively splined to the selector members 37 and 53 to transmit rotatable movement of the second selector member 53 to the first selector member 37 while permitting axial movement of the selector members 37 and 53 relative to the drive plate 63 as previously set forth, the axial movement of the second selector member 53 being for the purpose of unlocking the second selector member 53 from the lock tang 92 and the axial movement of the first selector member 37 being for the purpose of adjusting the position of the temperature responsive device 34.

Thus, in order for an operator to operate the control device 30, the selector member 53 must be first moved axially inwardly to free the lock tang 90 thereof from the lock tang 92 of the support means 31 and then the selector member 53 can be rotated to select the temperature setting of the temperature responsive means 34 by the second selector member 37 and to control the operation of the switch means 35 and 36 through the rotation of the cam member 78 that carries the drive plate 63 in the manner previously set forth.

Another control device of this invention is generally indicated by the reference numeral 30A in FIGS. 12-21 and parts thereof similar to the parts of the control device 30 previously described are indicated by like reference numerals followed by the reference letter "A".

Figure 19:
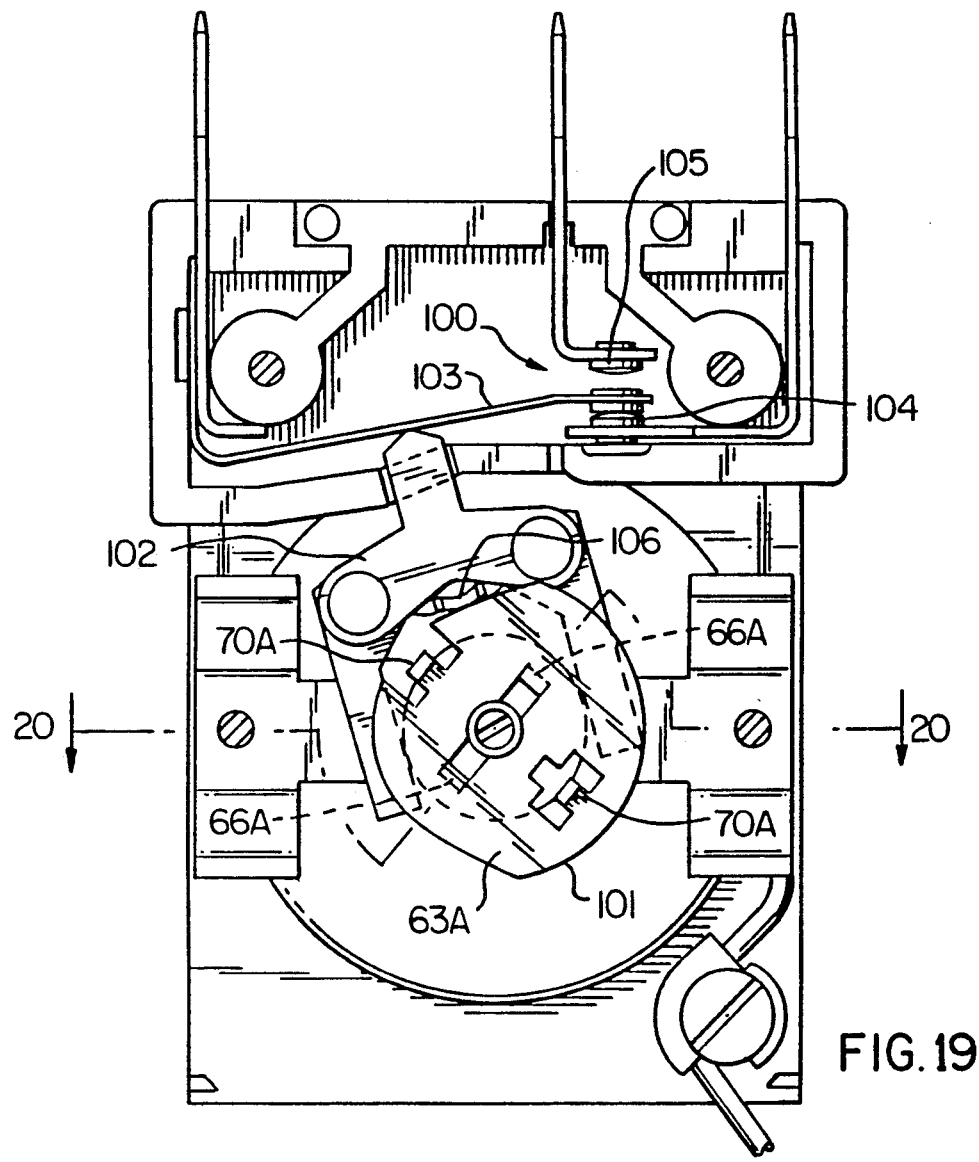
FIG. 19 is a cross-sectional view of the control device of FIG. 12 taken in the direction of the arrows 19—19 of FIG. 14.
Figure 20:
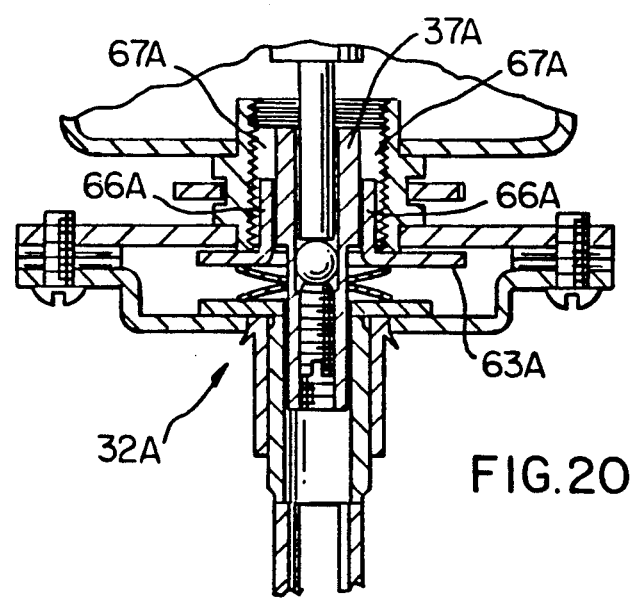
FIG. 20 is a fragmentary cross-sectional view taken on line 20—20 of FIG. 19.
Figure 21:
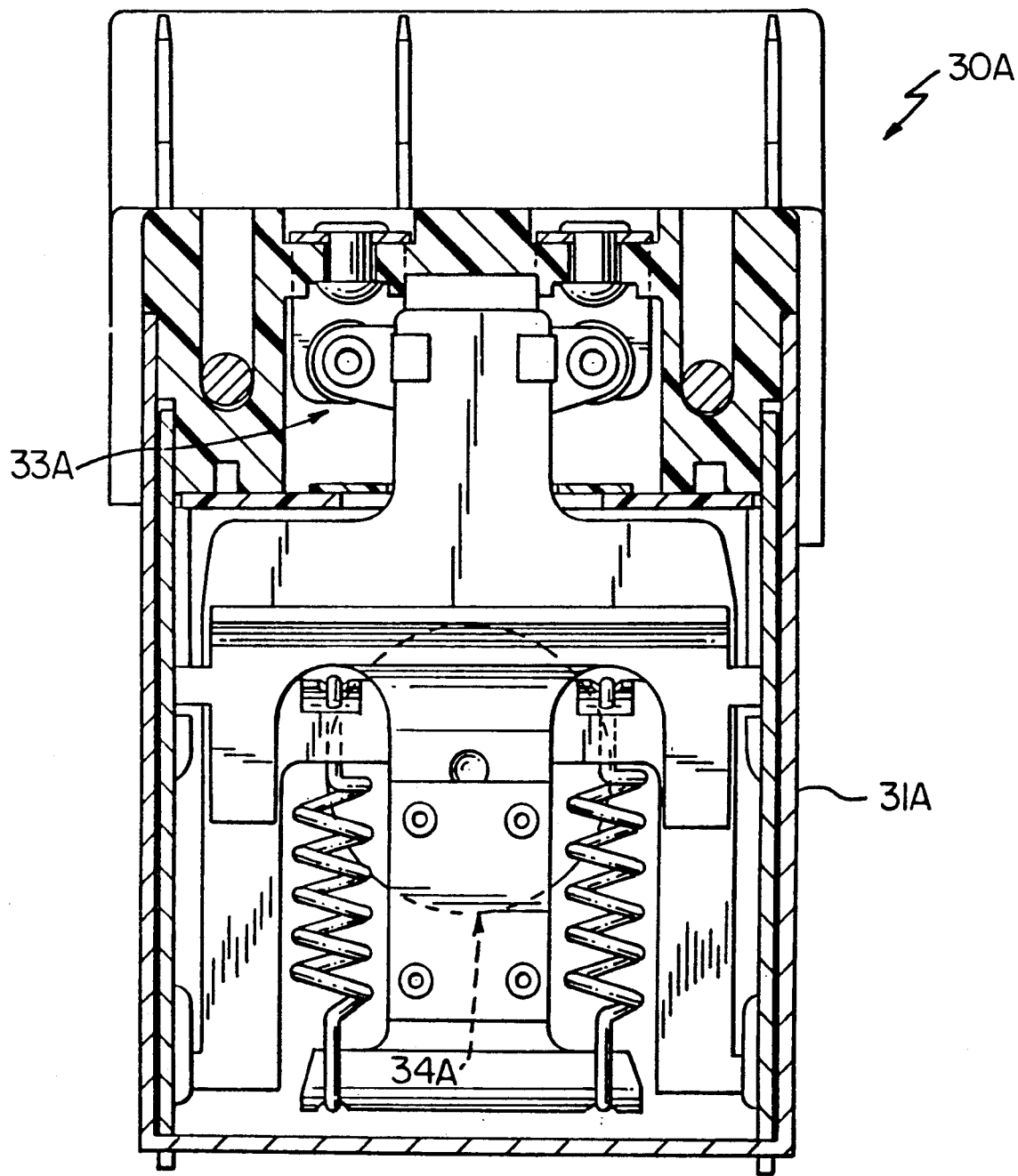
FIG. 21 is a cross-sectional view taken on line 21—21 of FIG. 14.

Basically, the control device 30A is substantially the same as the control device 30 previously set forth except that the control device 30A has a differently constructed switch means that is generally indicated by the reference numeral 100 in FIG. 19 in place of the switch means 35 and 36 previously described, the switch means 100 being controlled by an outer peripheral cam surface or surface means 101 on the drive plate means 63A of the push to turn selector means 32A of the control device 30A whereby the configuration of the drive plate means 63A is slightly different than the configuration of the drive plate 63 previously described although the drive plate 63A has the spline means 66A and 70A for respectively cooperating with the slots or grooves 67A and 71A of the selector members 37A and 53A for the purpose previously set forth.

The cam surface 101 of the drive plate 63A operates a movable blade actuator means or control structure 102 of the switch means 100 that controls the position of a switch blade 103 relative to fixed contact means 104 and 105 for any desired purpose.

Figure 14:
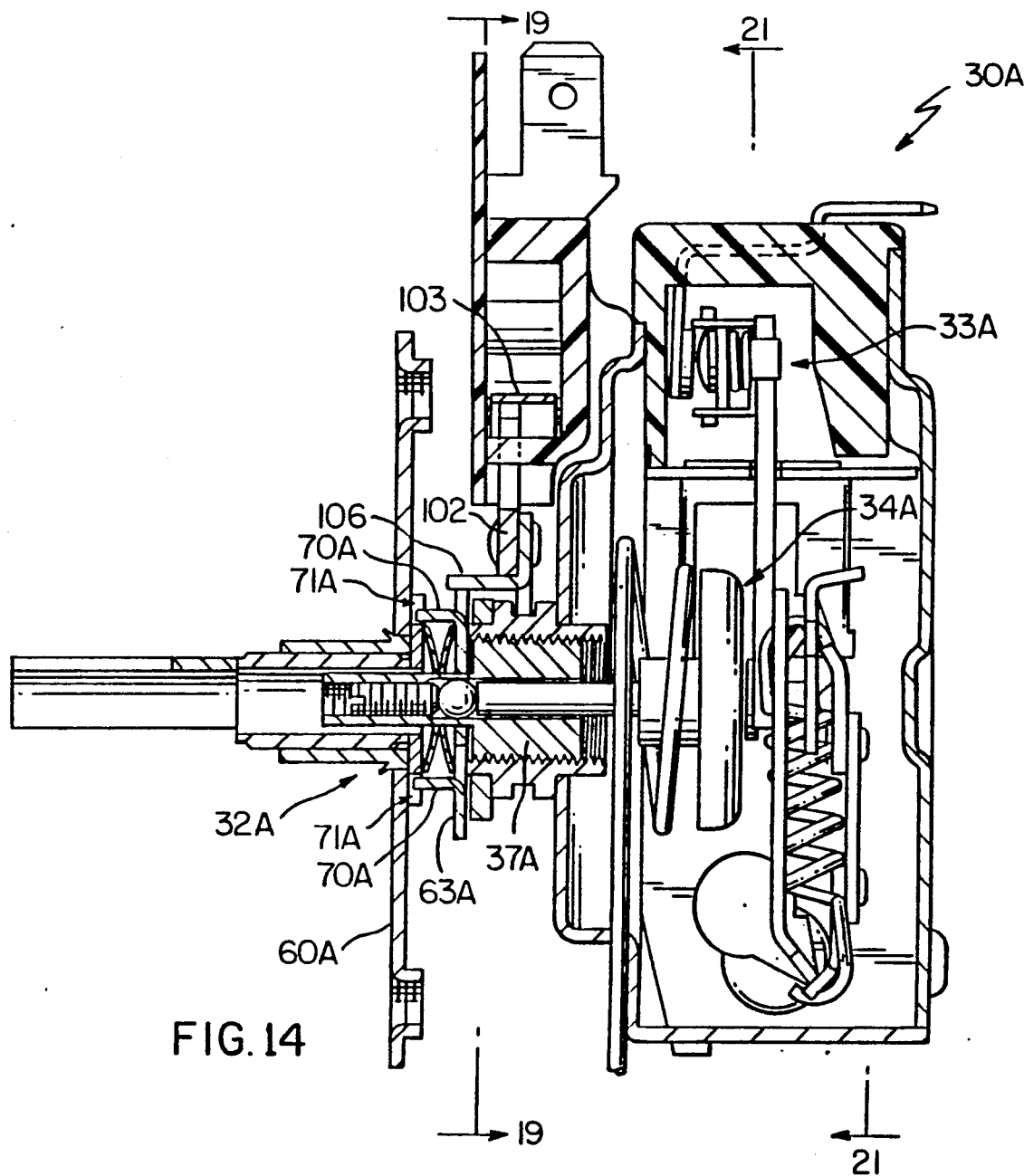
FIG. 14 is an enlarged cross-sectional view taken on line 14—14 of FIG. 12.
Figure 15:
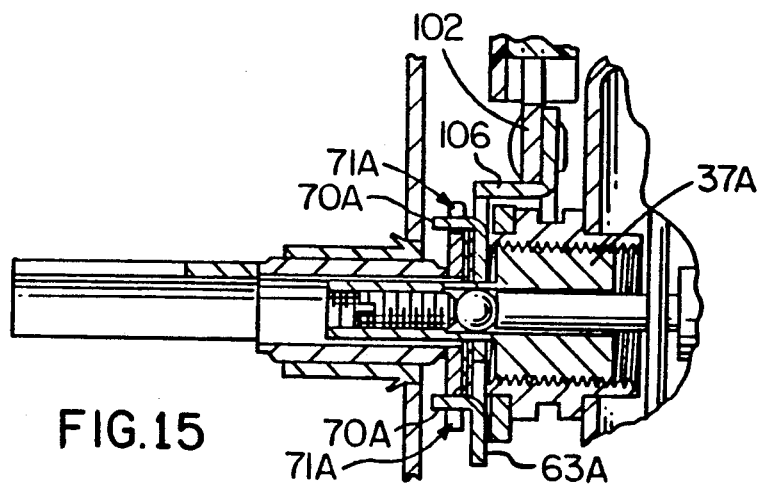
FIG. 15 is a fragmentary view similar to FIG. 14 and illustrates the second selector member of the push to turn selector means having been axially pushed inwardly to its unlocket position.
Figure 16:
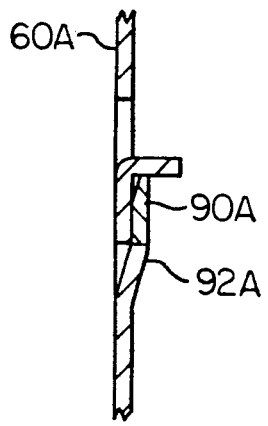
FIG. 16 is a fragmentary cross-sectional view taken on line 16—16 of FIG. 13 and illustrates the structure of the support means of the control device locking the second selector member in its axially outward position.
Figure 17:
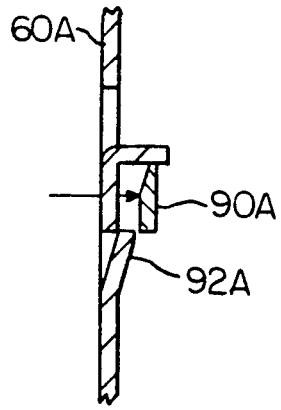
FIG. 17 is a view similar to FIG. 16 and illustrates how the second selector member is unlocked from the support means when the second selector member has been axially pushed inwardly to the position of FIG. 15.
Figure 18:
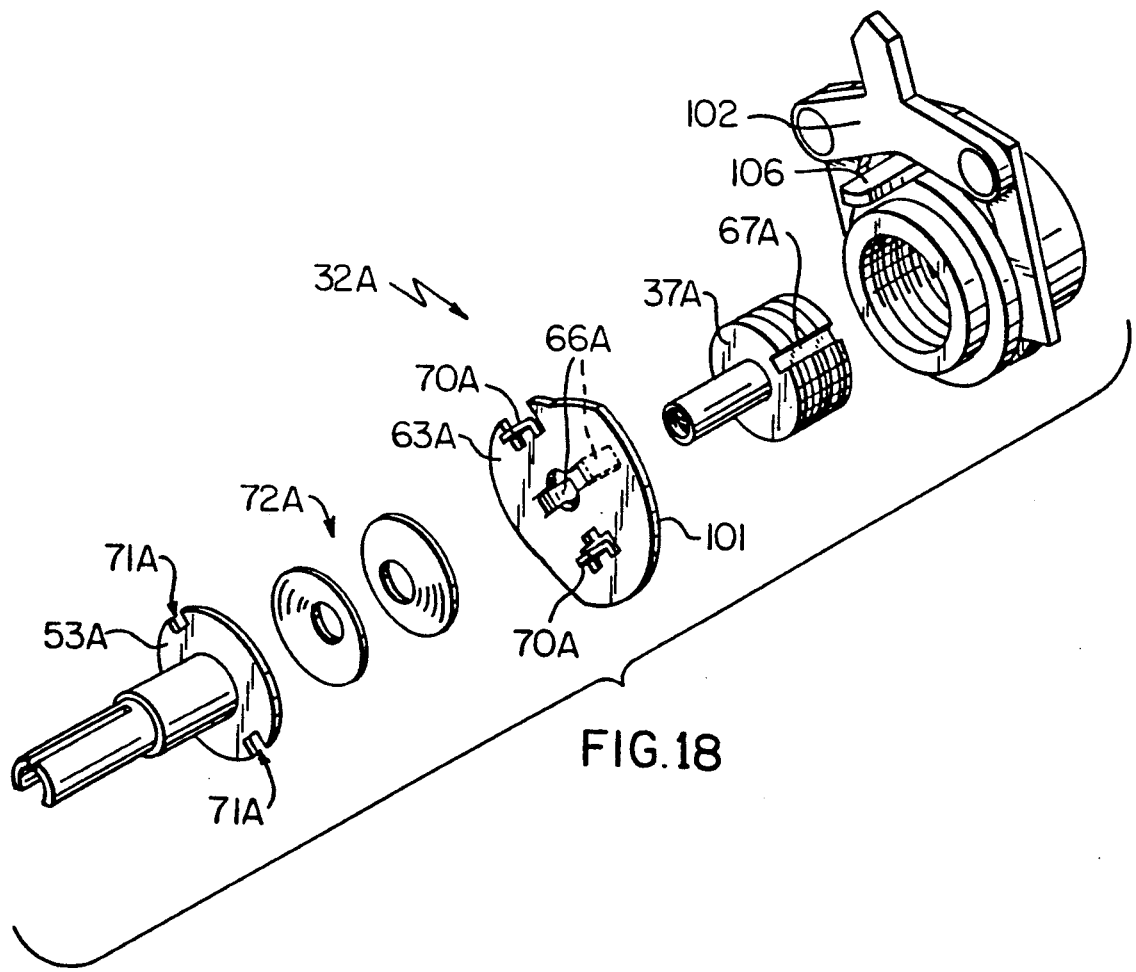
FIG. 18 is an exploded perspective view of the various parts that form the push to turn selector means for the control device of FIG. 12.

Therefore, it can be seen that the selector means 32A of the control device 30A operates in the same manner as the selector means 32 previously set forth in that the selector member 53A must be first moved axially inwardly from the position illustrated in FIG. 14 to the position illustrated in FIG. 15 to clear the lock tang 90A thereof from the lock tang 92A of the wall 60A to permit the selector member 53A to thereafter be rotated in a counterclockwise direction to the desired operating position thereof wherein the rotational movement of the selector member 53A is transmitted by the drive plate 63A to the selector member 37A as well as to the switch means 100 through the action of the cam surface 101 acting on a cam follower 106 of the actuator 102.

Therefore, it can be seen that various changes can be made in the various parts of the push to turn selector means 32 and 32A of this invention with the same still operating in the manner previously set forth wherein the drive plate means 63 or 63A thereof still performs the function of coupling the two selector members together to transmit rotatable movement of the second selector member to the first selector member while permitting axial movement of the selector members relative to the drive plate, the drive plate additionally being rotatable with the second selector member to control other operating structure of the control device, if desired.

Therefore, it can be seen that this invention not only provides a new control device having a unique push to turn selector means, but also this invention provides a new method of making such a control device.

While the forms of this invention now preferred have been illustrated and described as required by the Patent Statute, it is to be understood that other forms can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control device having a push to turn selector means and comprising a support means, a first selector member threadedly carried by said support means so as to be rotatable and axially movable relative thereto, a second selector member rotatably carried by said support means and being axially movable relative thereto, coupling means coupling said selector members together to cause said first selector member to rotate in unison with said second selector member when said second selector member is axially pushed inwardly and then rotated, and spring means disposed between said selector members to tend to maintain said second selector member axially away from said first selector member, the improvement wherein said coupling means comprises a drive plate rotatably carried by said support means intermediate said selector members and having means respectively splined to said selector members to transmit rotatable movement of said second selector member to said first selector member while permitting axial movement of said selector members relative to said drive plate, said control device comprising control structure movably carried by said support means and having surface means, said drive plate having surface means engaging said surface means of said control structure so as to operate said control structure as said drive plate is rotated by said second selector member.

2. A control device as set forth in claim 1 wherein said drive plate is telescopically disposed on said first selector member.

3. A control device as set forth in claim 1 wherein said drive plate comprises a one-piece member with its spline means.

4. A control device as set forth in claim 3 wherein said spline means comprise a plurality of tangs bent relative to said drive plate.

5. A control device as set forth in claim 4 wherein said spline means comprise a pair of said tangs splined with said first selector member and a pair of said tangs splined with said second selector member.

6. A control device as set forth in claim 5 wherein said pair of tangs that are splined with said second selector member are disposed radially outward of said spring means.

7. A control device as set forth in claim 1 wherein said surface means of said control structure and said surface means of said drive plate are splined together.

8. A control device as set forth in claim 7 wherein said control structure comprises a cam member rotatably carried by said support means.

9. A control device as set forth in claim 8 wherein said cam member rotates in unison with said drive plate.

10. A control device as set forth in claim 1 wherein said surface means of said drive plate comprises a cam surface.

* * * * *